United States Patent [19]
Tomita et al.

[11] Patent Number: 5,649,048
[45] Date of Patent: Jul. 15, 1997

[54] VIDEO TAPERECORDER WITH TELEVISION STANDARDS CONVERTER

[75] Inventors: Masao Tomita, Neyagawa; Takuya Otsuki, Hirakata; Sakon Nagasaki, Katano, all of Japan

[73] Assignee: Matsushita Electric Industrial Co., Ltd., Osaka, Japan

[21] Appl. No.: 262,374

[22] Filed: Jun. 20, 1994

Related U.S. Application Data

[63] Continuation of Ser. No. 451,241, Dec. 15, 1989, abandoned.

[30] Foreign Application Priority Data

| Dec. 23, 1988 | [JP] | Japan | 63-326631 |
| Jan. 30, 1989 | [JP] | Japan | 1-020026 |
| Mar. 10, 1989 | [JP] | Japan | 1-058366 |
| Mar. 10, 1989 | [JP] | Japan | 1-058367 |
| Mar. 17, 1989 | [JP] | Japan | 1-067008 |
| Mar. 17, 1989 | [JP] | Japan | 1-067009 |
| Apr. 27, 1989 | [JP] | Japan | 1-108823 |

[51] Int. Cl.$^6$ .............................. H04N 5/91; H04N 7/01
[52] U.S. Cl. .................................... 386/131; 386/46
[58] Field of Search ................... 358/335, 342, 358/310; 360/33.1, 32, 9.1; 348/443, 444, 448; H04N 5/76, 7/01, 5/91

[56] References Cited

U.S. PATENT DOCUMENTS

| 3,968,514 | 7/1976 | Narahara et al. | 358/330 |
| 4,240,101 | 12/1980 | Michael et al. | 358/11 |
| 4,283,736 | 8/1981 | Morio et al. | 358/4 |
| 4,283,738 | 8/1981 | Rutishauser | 358/11 |
| 4,340,951 | 7/1982 | Motoyama et al. | 360/32 |
| 4,366,371 | 12/1982 | d'Alayer de Costemore et al. | 360/72.3 |
| 4,500,930 | 2/1985 | Hamalainen et al. | 358/310 |
| 4,520,401 | 5/1985 | Takahashi et al. | 358/310 |
| 4,568,963 | 2/1986 | Sasaki et al. | 358/11 |
| 4,587,556 | 5/1986 | Collins | 358/140 |
| 4,757,390 | 7/1988 | Mehrgardt et al. | 358/310 |
| 4,862,266 | 8/1989 | Gillard | 348/443 |

FOREIGN PATENT DOCUMENTS

| 0076047 | 4/1983 | European Pat. Off. | 358/310 |
| 58-942291A | 6/1983 | Japan . | |
| 0146580 | 6/1988 | Japan | H04N 5/76 |

OTHER PUBLICATIONS

Patent Abstracts of Japan, vol. 9, No. 140 (E–321)[634], 24th Oct. 1980; & JP-A-55 100 792 (Mitsubishi Denki K.K.) 31-07-1980.
Patent Abstracts of Japan, vol. 9, No. 140 (E–321)[1863], 14th Jun. 1985; & JP-A-60 22 891 (Sharp K.K.) 05-02-1985

(List continued on next page.)

*Primary Examiner*—Thai Q. Tran
*Assistant Examiner*—Huy Nguyen
*Attorney, Agent, or Firm*—Watson Cole Stevens Davis, P.L.L.C.

[57] ABSTRACT

A video tape recorder is provided which is capable of handling plural television standards. The tape recorder includes a video signal processing unit for recording and reproducing video signals selectively in plural television standards, a television standards converter for performing a conversion operation by converting a video signal in a first one of the television standards into a video signal of a second one of the television standards, and a convert control unit for controlling the conversion operation of the television standards converter to operate in (1) a recording mode to convert an input video signal in a first one of the television standards into a second one of the television standards and to provide the converted input video signal to the processing unit for recording and (2) a reproducing mode to convert a reproduced video signal, received from the processing unit, in a first one of the television standards into a second one of the television standards and to output the converted reproduced video signal.

29 Claims, 13 Drawing Sheets

OTHER PUBLICATIONS

K.B. Benson, "Television Engineering Handbook", McGraw–Hill Book Company, pp. 18.62–18.65. 1986.

M. Tomita, et al, "Video Tape Recorder with Digital Television Standards Converter", IEEE Transactions on Consumer Electronics, vol 36, No. 3, Aug. 1990.

VCR Special Report, "Setting New Standards", *Which Video*, pp. 38–40, Sep. 1990.

"We Are the World", *What Video*, pp. 66–67 and 69, Mar. 1991.

Masami Itoga and Yutaka Takata, Triple System Color TV, Video Cassette Recorder and Projection TV, Mar. 1980, Misubishi Electric Avanee, 25–26 vol. 11.

K.B. Benson: CBS Television Standards Conversion Techniques, J. SMPTE vol. 70, Nov. 628 (1961).

P. Rainger; An all Electronic field–Store Television Standards Converter, E.BIU Rev., Part A–technicaln No. 103, P90 (1967).

"Digital Television Standards Conveter" by You Taminura, et al in NGK Technical Research Monthly Report SHO 4: 4 pp. 145–152.

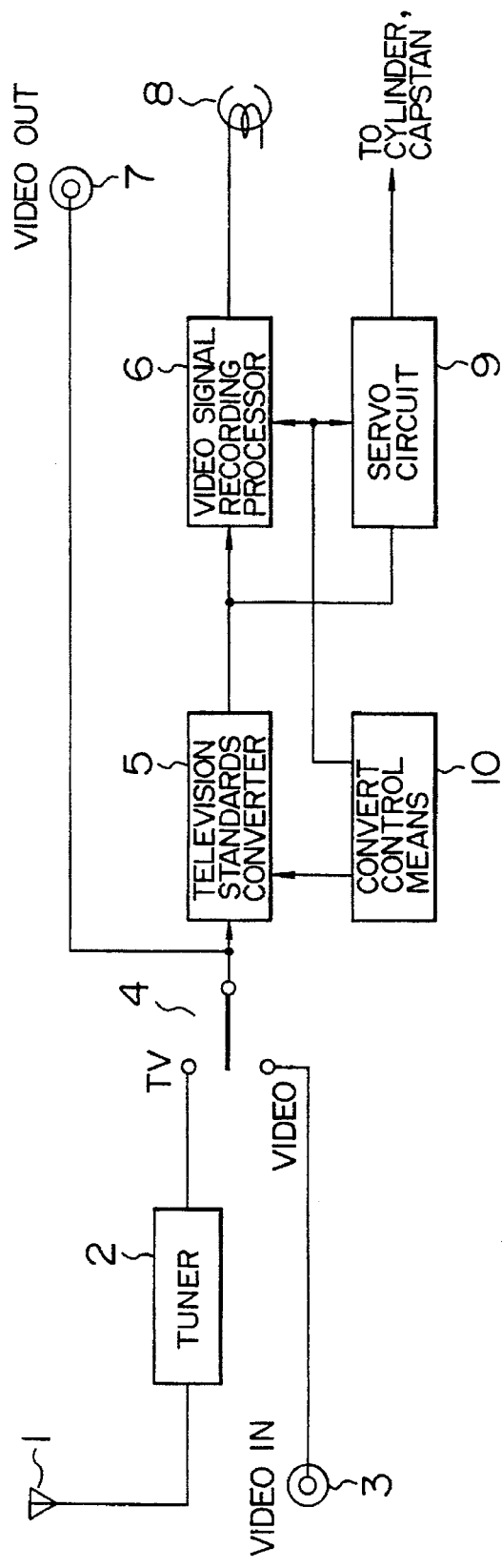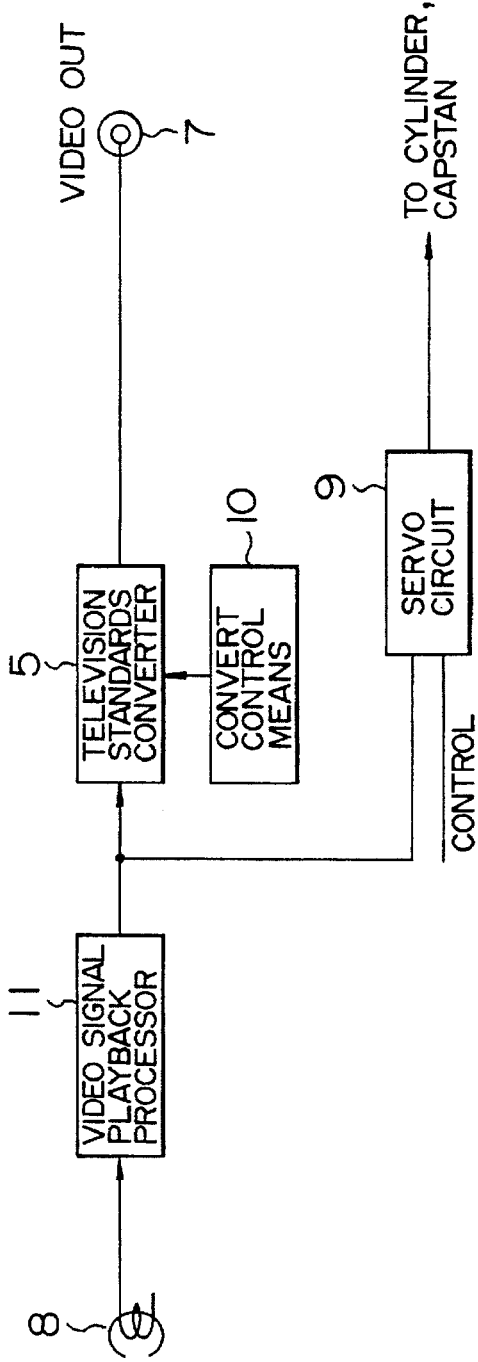

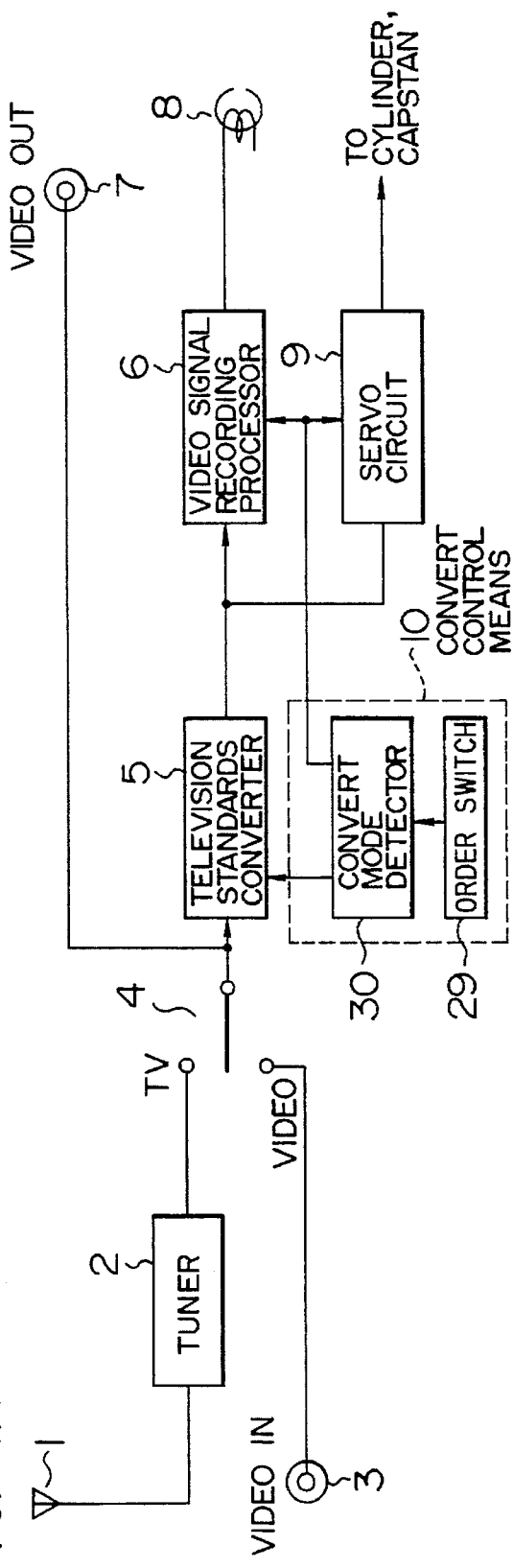
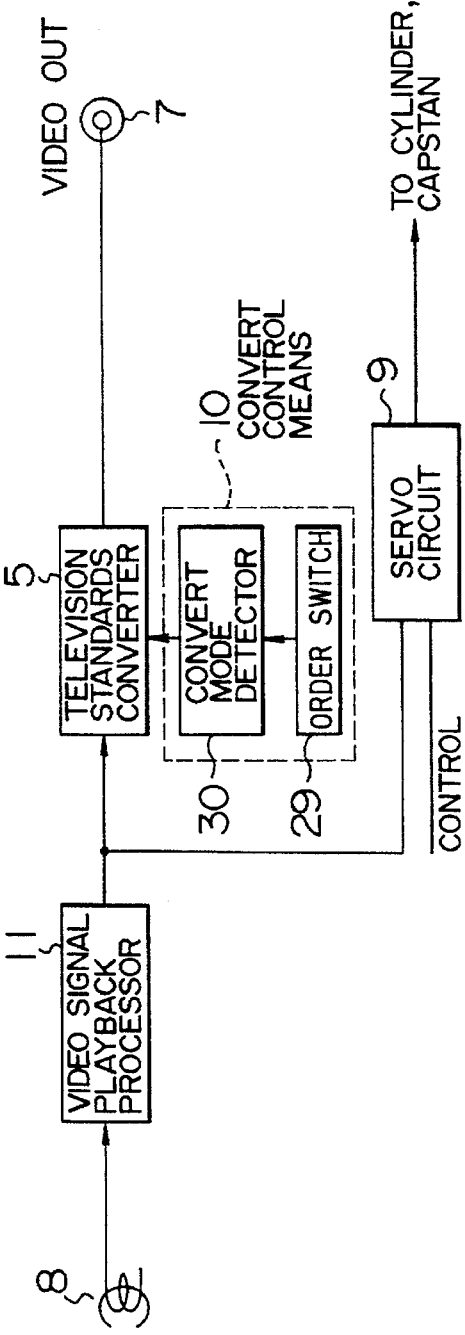
FIG. 4A RECORDING MODE
FIG. 4B PLAYBACK MODE

F I G. 9A
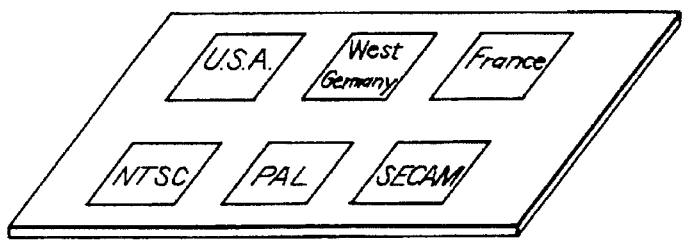
F I G. 9B
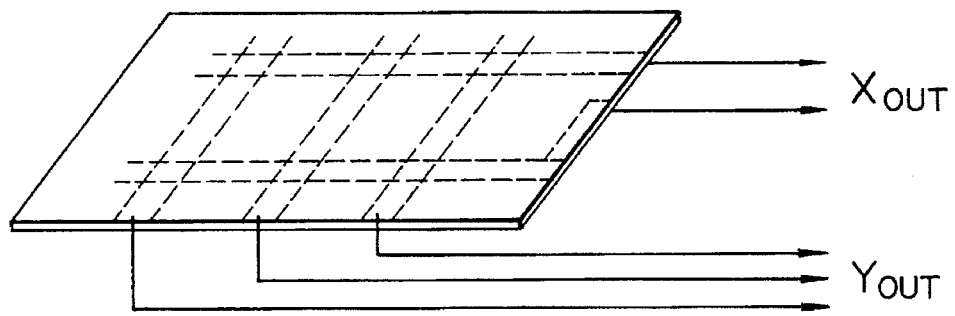
F I G. 9C
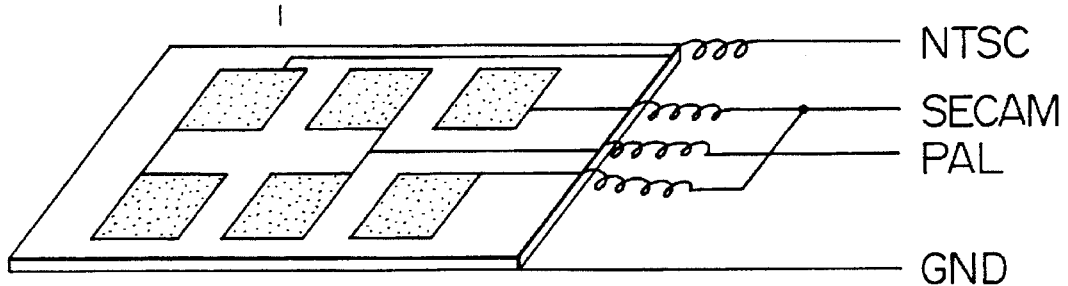

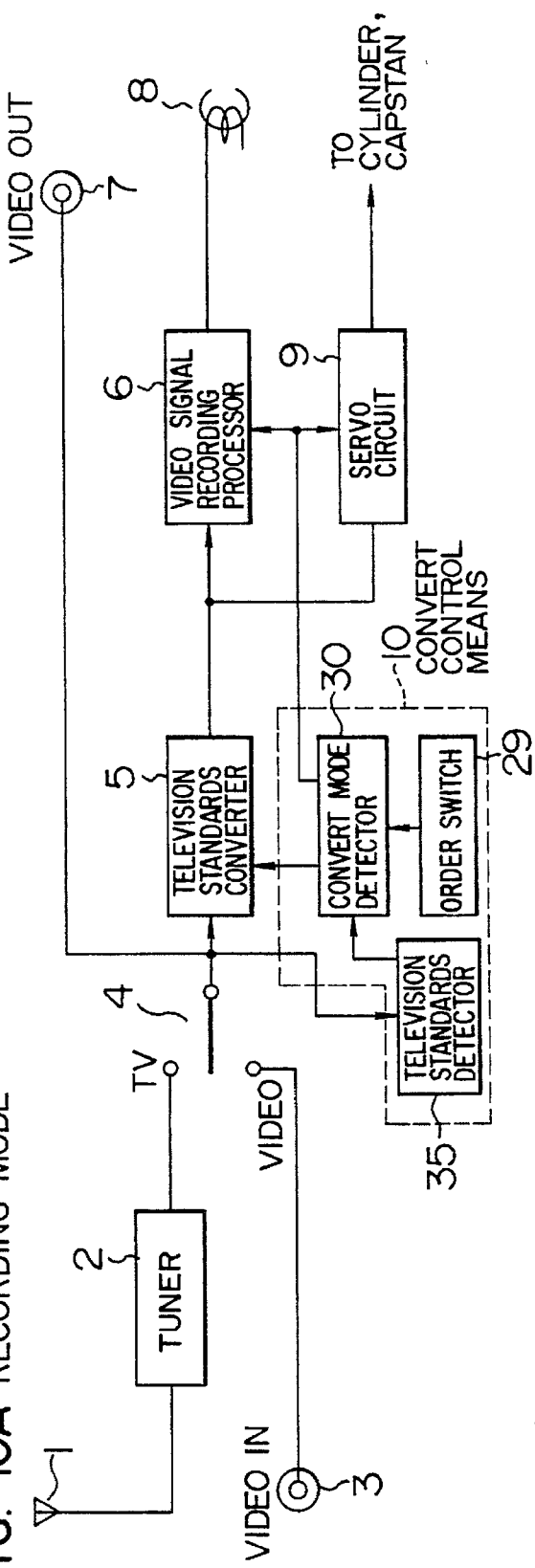
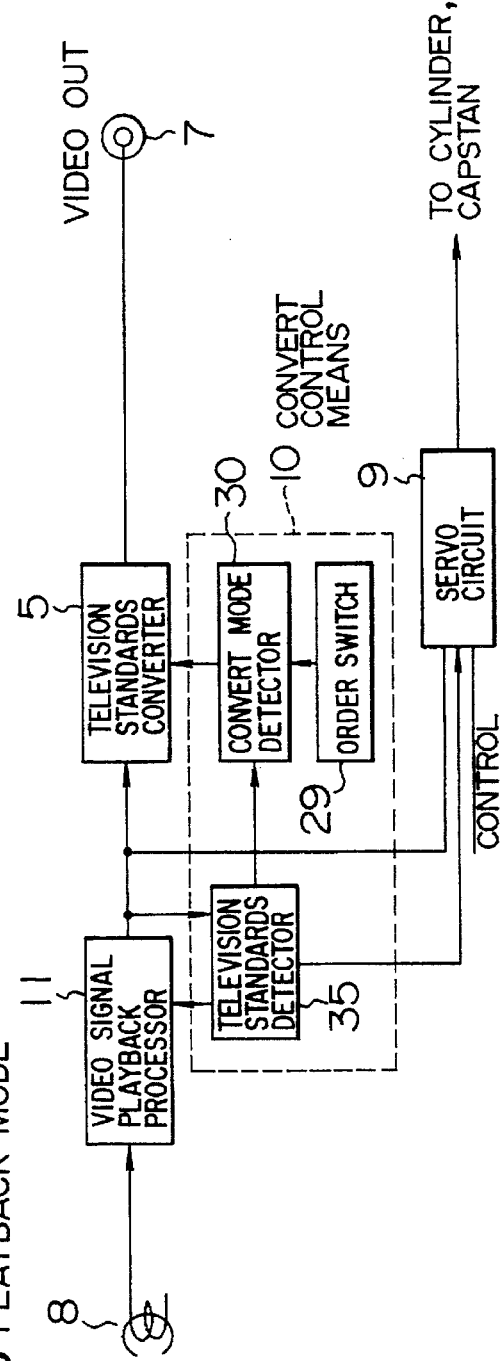
FIG. 10A RECORDING MODE
FIG. 10B PLAYBACK MODE

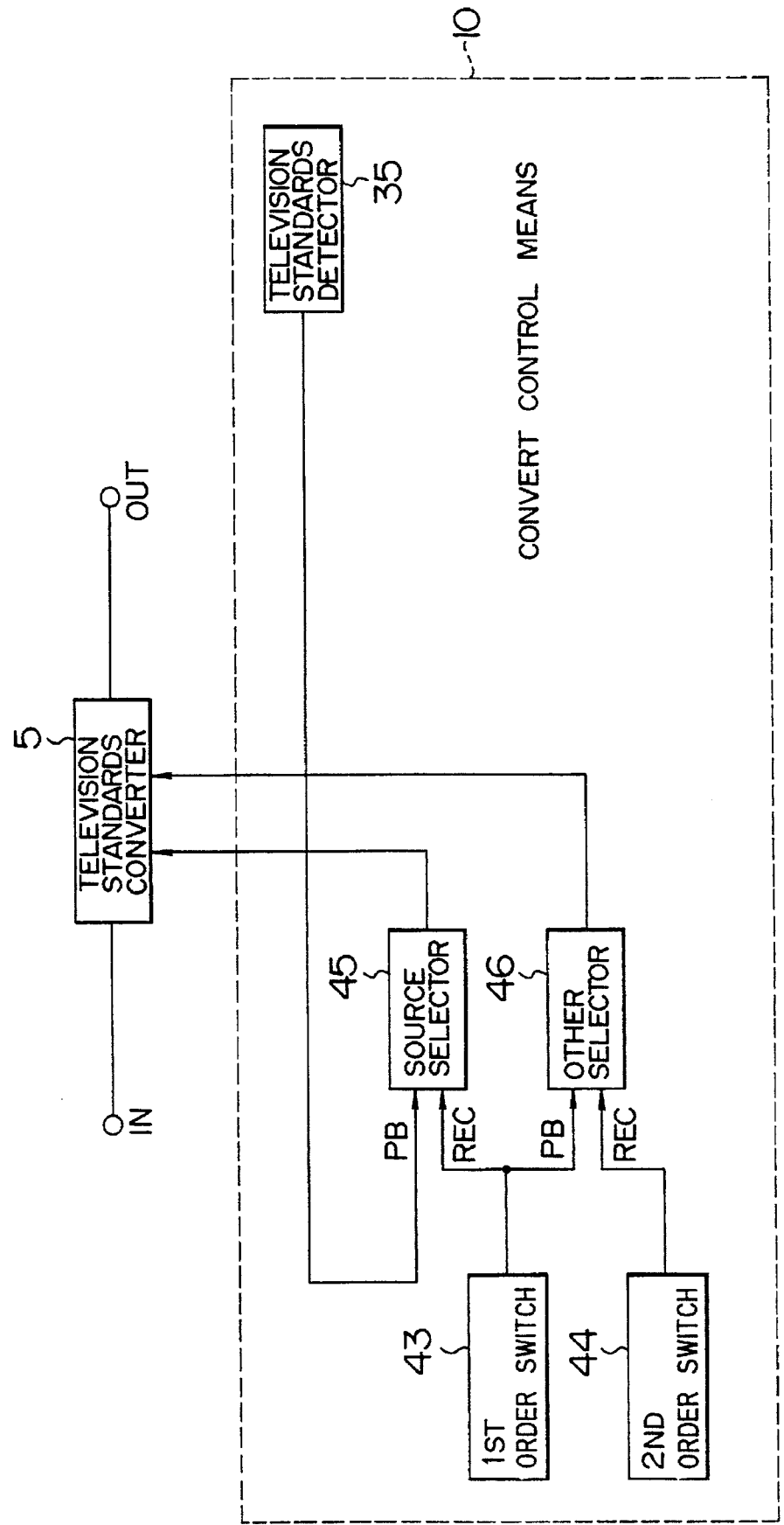

VIDEO TAPERECORDER WITH TELEVISION STANDARDS CONVERTER

This application is a continuation of application Ser. No. 07/451,241, filed Dec. 15, 1989 (abandoned).

BACKGROUND OF THE INVENTION

The present invention relates to a video taperecorder for recording and reproducing a video signal which can easily convert television standards to record and reproduce a desired television standards signal.

The television standards now used in all the countries in the world are not unified, but several kinds of signal modes are used therefor. The typical television standards include three systems of NTSC (National Television System Committee), PAL (Phase Alternation by Line) and SECAM (Séquential à Mémoire); some systems in which these typical television standards are slightly modified are also used.

The video signal modes in these three typical television standards are as follows. NTSC is basically in the mode of the interlace scanning of 30 frames/sec (field frequency of 60 Hz), the number of scanning lines per one frame of 525, and the carrier frequency for color signals of about 3.579 MHz. PAL is basically in the mode of the interlace scanning of 25 frames/sec (field frequency of 50 Hz), the number of scanning lines per one frame of 625, and the carrier frequency for color signals of about 4.433 MHz. SECAM is in nearly the same mode as in PAL except the color signal transmission process in which two color difference signals R - Y and B - Y are exchanged for each scanning line, i.e. the chrominance subcarrier is frequency-modulated in a line sequential manner.

Household video tape recorders (VTR's) are usually designed to adapt the television standards in a consumer country. For example, for Japan and U.S.A, adopting NTSC, they are designed so that the rotating frequency of a rotary head is set for 30 Hz which is half the field frequency, one field signal corresponding to 262.5 H's (H: one scanning line) is recorded on one track, and a color signal is recorded in a manner of converting the carrier chrominance signal as a color signal is converted from 3.579 MHz to a low frequency of 629 KHz. Also, for the countries adopting PAL such as West Germany, China, etc. the VTR's are designed so that the rotating frequency of a rotary head is set for 25 Hz, one field signal corresponding to 312.5 H's is recorded on one track, and a color signal is recorded in a manner of converting it from 4.433 MHz to the low frequency of 627 KHz. Moreover, for countries adopting SECAM such as France, the VTR's are designed so that a frequency-modulated color signal is recorded in a manner of converting it into a low frequency or counting down (frequency dividing) it. Additionally, the played-back signal, since the television receivers in each country are adapted to the television standards adopted in the country, is outputted in the signal mode corresponding to that television standards.

It should be noted that VTR's adapting to plural television standards are shipped for areas in Europe where both PAL and SECAM can be received, and for areas where sources of plural television standards are intermingled, such as the Near and Middle East and Southeast Asia.

As described above, since the household VTR's are designed so that they adapt to the television standards adopted in the area concerned, for example, it was impossible to play back, in Japan, the tape recorded in PAL and also impossible to play back in West Germany the tape recorded in NTSC. Moreover, the VTR's adapted to plural television standards for e.g. the Near and Middle East, can play back the tape recorded in plural television standards; however, the reproduced image involves expansion and contraction to be unsightly, and also the VTR's cannot convert one television standards into another one so as to record the NTSC source in PAL, for example.

Previously known techniques for converting a certain television standards signal into another television standards signal are disclosed in, for example, (1) K. B. Benson: CBS Television Standard Conversion Technique, J. SMPT, Vol. 70, No. 628 (1961), and (2) P. Paiger: An all Electronic field-store Television Standards Converter, E. BIU Rev. Part A-Technical, No. 103, p. 90 (1967).

These techniques, however, are embodied in an apparatus constructed in a large scale system; since such an apparatus is expensive and requires a large space, it could be only installed in e.g. a television station. Also, if these techniques are to be used in combination with a television and VTR, troublesome operations of changing the manner of connecting the respective units and setting a new mode were required.

In recent years, there is a growing tendency for information in the world to be unified or centralized and so an eager demand of freely exchanging images among countries. As understood from the above description, the present household VTR's are very insufficient to satisfy such a demand.

SUMMARY OF THE INVENTION

In view of such a problem, the present invention, by incorporating a converter for converting television standards in a VTR and effectively changing the manner of connecting it with a tuner, a servo system and video signal processing system, intends to provide a video taperecorder which can play back the tape recorded in different television standards from those adopted in one's own country and record video signals in different television standards from those adopted in one's own country.

In order to solve the above problem, in accordance with the present invention, there is provided a video tape recorder comprising a servo system and a video signal processing system which can record and reproduce plural television standards video signals, a television standards converter for converting one television standards video signal into another television standards video signal, and a conversion control means for controlling the conversion operation of the television standards converter, whereby there are provided a mode of converting an input television standards signal into another television standards signal to be recorded, and a mode of converting a reproduced television standards signal into another television standards signal to be outputted.

In accordance with the present invention, in recording, the television standards signal converter is adapted to be connected before a recording processing circuit to permit a different television standards signal to be recorded whereas in play-back, it is adapted to be connected behind a play-back processing circuit to permit a different television standards signal to be output. Thus, a record tape can be formed in different television standards from those adopted in one's own country, and the tape recorded in the television standards adopted in the other country can be played back in the television receiver adapted to the television standards adopted in one's own country; international video information, therefore, can be unified through the VTR according to the present invention.

The first object of the present invention is to provide a video taperecorder (VTR) which is conveniently operated with any of various television standards.

The second object of the present invention is to provide a VTR which permits a user to play back or form the video tape in different television standards through a simple operation.

The third object of the present invention is to provide a VTR which can exhibit an efficient and legible display.

The fourth object of the present invention is to provide a VTR incorporating means for converting television standards through a simple circuit.

BRIEF DESCRIPTION OF THE DRAWINGS

FIG. 1 is a block diagram of the video taperecorder (VTR) with a television standards converter (TSC) according to the present invention;

FIG. 4 is a basic block diagram of the VTR with a TSC according to the present invention in which the basic configuration of a convert control means 10 is illustrated;

FIG. 9 is a view showing the assembly of a switch panel including the order switch in the convert control means and a lighted display;

FIG. 10 is a block diagram showing the relationship between the basic construction of the VTR with a TSC according to the present invention and the convert control means including a television standards detector 35;

FIG. 13 is a block diagram for assisting the understanding of the operation of the convert control means.

DESCRIPTION OF THE PREFERRED EMBODIMENTS

Figure 2:
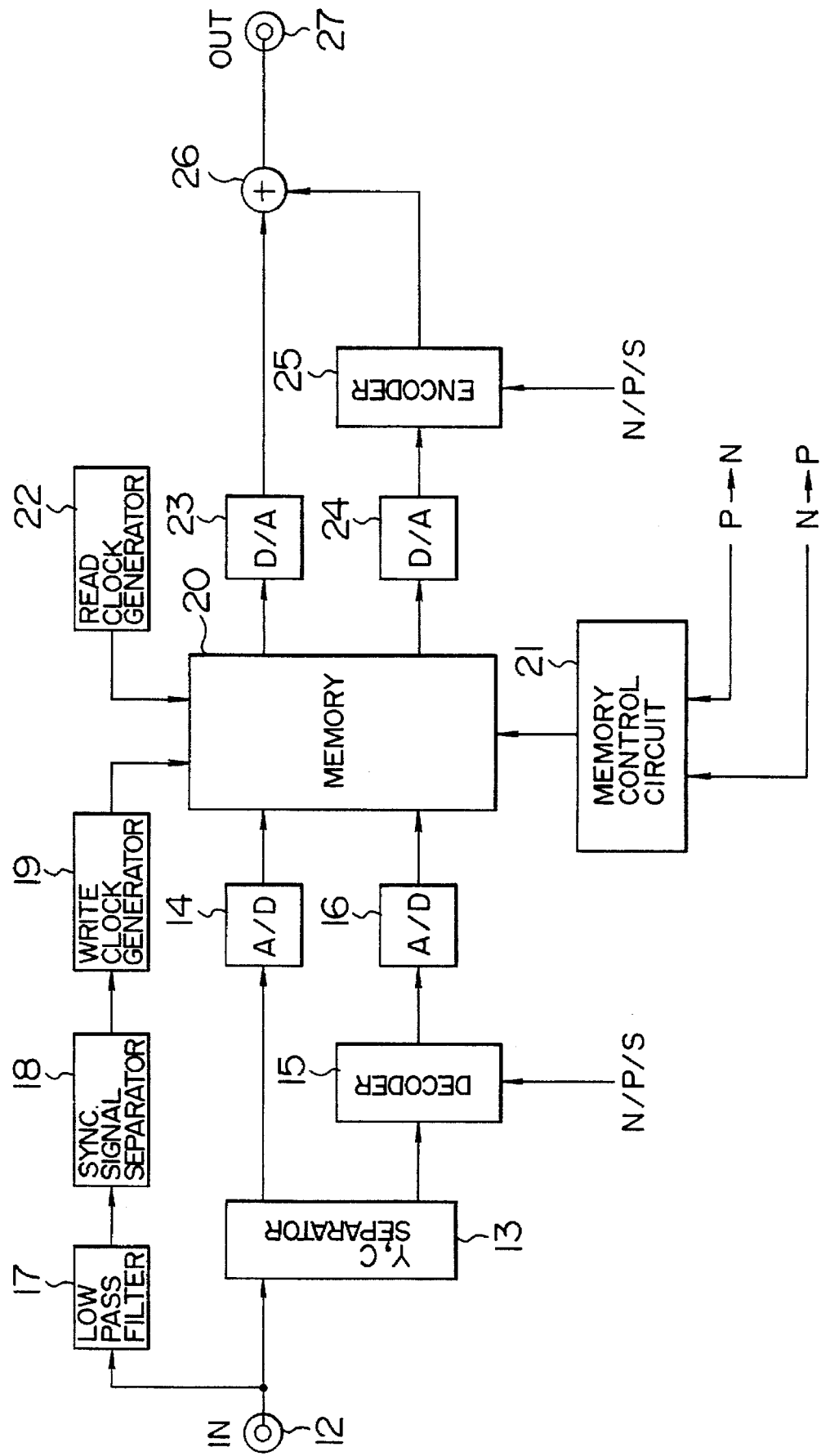
FIG. 2 is a block diagram of one embodiment of the television standards converter used in the present invention.

Now referring to the drawings, a video tape recorder according to one embodiment of the present invention will be explained. FIG. 1 is a block diagram of one embodiment of the video tape recorder according to the present invention. In FIG. 1, (A) indicates a recording mode; 1 is an antenna terminal, 2 is a tuner, 3 is a video input terminal, 4 is an input changeover switch, 5 is a television standards converter which converts the television standards in accordance with convert control means 10, 6 is a video signal recording processor, 7 is a video output terminal, 8 is a rotary head, and 9 is a servo circuit. (B) indicates a playback mode in which a video signal playback processor is arranged between the rotary head 8 and the television standards converter 5.

The operation of the VTR thus constructed will be explained. It is now assumed that the VTR according to this embodiment is used in Japan and U.S.A.

The operation in the recording mode is as follows. A television signal supplied from the antenna terminal 1 is tuned and demodulated by the tuner 2. The signal thus generated appears as an NTSC composite signal at the television terminal TV of the input changeover switch 4. Assuming that the changeover switch 4 has selected the television signal, the NTSC composite signal is supplied to the television standards converter 5 which serves to convert the television standards in response to an instruction from the convert control means 10. Now it is assumed that the convert control means 10 has instructed the converter to select the NTSC signal. In this case, since an input signal to the television standards converter 5 is the NTSC signal, the television standards converter 5 permits the NTSC signal to pass so as to be supplied to the video signal processor 6 and servo circuit 9. Then, the convert control means 10 instructs both servo circuit 9 and video signal processor 6 to receive the NTSC signal. In response to this, in order that the NTSC signal can be recorded, the servo circuit 9 supplies a control signal to a capstan motor, a cylinder incorporating the rotary head 10, and a control head for recording the control signal. Also, in order that the received NTSC signal can be recorded using the rotary head 8, the video signal recording processor 6 performs suitable processings such as emphasis and frequency modulation. Then, the NTSC signal which is also an output from the television standards converter 5 is sent to the video output terminal 7. In this way, if the convert control means 10 selects NTSC, the VTR according to this embodiment operated in entirely the same way as the conventional VTR for the NTSC bloc.

On the other hand, if the convert control means 10 selects PAL, the television standards converter 5 operates to convert the input NTSC signal to a PAL signal, and also the servo circuit 9 and video signal processor 6 operate to permit the PAL signal to be recorded. Thus, the NTSC television signal input to the antenna terminal 1 and tuned/demodulated by the tuner 2 can be recorded as the PAL signal on a magnetic tape by the rotary head 8. Then, the NTSC signal before the conversion, which is sent to the video output terminal 7, can be monitored by a usual NTSC television receiver. In this way, a record tape in the PAL standards which are different from the NTSC standards by which the broadcasting is carried out can be formed.

Moreover, if the changeover switch 4 selects a video signal (but not the television radio wave), the video signal applied to the video input terminal 3, e.g. the played-back NTSC signal supplied from the other VTR can be converted into the PAL signal by the television standards converter 5 thereby to be recorded; the video information recorded in NTSC can be dubbed in PAL.

Although in the above explanation, the conversion from NTSC to PAL was made, the conversion reverse to it and to the other standards including SECAM can also be made.

It will be needless to say that the antenna terminal 1 and tuner 2 shown in FIG. 1A may not be necessarily provided and so a VTR of the present invention may be arranged with a video input terminal 3 without including such antenna terminal and tuner.

The operation of the playback mode in (B) is as follows. Now it is assumed that the tape recorded in PAL has been set in the VTR according to this embodiment. Then, the signal included in the tape is picked up by the rotary head 8 and the signal thus formed is subjected to the processings such as de-emphasis and FM modulation by the video signal processor 11; the PAL thus played back appears at the output of the video signal processor 11 (In this case, the television standards in which the signal was recorded are usually decided automatically by, for example, measuring the field frequency based on the control signal recorded on a control track; the instruction for carrying out it is supplied to the video signal playback processor 11 or the servo circuit 9). However, the played-back PAL signal, when monitored as it is, cannot provide a normal image (no image appears or a very unsightly image appears) since the television receivers used in Japan and U.S.A. correspond to the NTSC standards. For this reason, the control convert means 10 is adapted to select NTSC; when an instruction is provided to the television standards converter 5, the converter 5 converts a supplied played-back PAL signal into an NTSC signal which is sent to the video output terminal 7. Therefore, if an NTSC television receiver is connected with the video output terminal 7, normal image can be monitored. Thus, the tape recorded in PAL can be normally monitored in the NTSC television receiver. Of course, the conversion from NTSC to PAL or to the other television standards including SECAM can be easily made.

FIG. 2 is a block diagram of one embodiment of the television standards converter 5 in FIG. 1. In operation, a composite signal applied to an input terminal 12 is separated into a luminance signal and chrominance signal by a Y - C separator 13. The luminance signal is digitized by an A/D converter 14 and the digitized luminance signal is applied to a memory 20. The chrominance signal is demodulated in accordance with the television standards such as NTSC, PAL, SECAM, etc. by a decoder 15. The color difference signal thus formed is digitized by an A/D converter 16 and applied to the memory 20. The memory 20, which is a digital memory storing a video signal over one or more fields, is controlled by a memory control circuit 21. A write clock therefor is supplied by a write clock generator 19 on the basis of the synchronous signal which is provided through a low pass filter 17 and a sync. separator 18 from the input signal. A read clock is supplied by a clock generator 22. The luminance signal of the digital signals subjected to the television standards conversion in the memory 20 is restored to the analog signal by a D/A converter 23. The digital color difference signal is restored to an analog signal by a D/A converter 24; the analog color difference signal is modulated into a carrier chrominance signal which adapts to each of the television standards such as NTSC, PAL, SECAM, etc. A mixer 26 mixes the luminance signal and the carrier chrominance signal to provide the composite signal subjected to the television standards conversion to an output terminal.

The operation of the television standards conversion will be explained. Now it is assumed that NTSC is to be converted into PAL. In NTSC, the field frequency is 60 Hz and the number of scanning lines per one field is 525/2, whereas in PAL, the former is 50 Hz and the latter is 625/2. The field frequency and the number of scanning lines per one field, therefore, must be converted. In order to realize this, the memory 20 is constructed so that the signal corresponding to one field written at a predetermined write clock can be read by a read clock independent of the write clock. Now if a conversion instruction from NTSC to PAL comes to the memory control circuit 21, for conversion of the field frequency, 60 fields in NTSC are read as 50 fields in PAL; this can be realized by controlling the memory 20 so that it skipps one field for every six fields. The conversion of the number of scanning lines from 525/2 to 625/2 can be realized by using a line memory in the memory 20 to interpolate new scanning line information from adjacent items of scanning line information. The above controls are made by selecting or arithmetically operating the information in the memory 20 in accordance with a control signal supplied from the memory control circuit 21.

On the other hand, the conversion from PAL to NTSC can be realized in such a manner that for conversion of the field frequency, one field is read twice for every six fields, and for conversion of number of scanning lines per one field, two items of scanning line information are operated. In this case, it should be noted that the luminance signal and the chrominance signal are processed separately in the memory 20.

Additionally, since SECAM is the same as PAL in the field frequency and the number of scanning lines per one line but different from PAL in that the color signal is FM modulated to be line-sequentially multiplexed, the conversion to SECAM can be realized by the color signal processing considering the difference.

It can be apparent to those skilled in the art that by providing more memories and interpolating fields or the frames instead of the technique described in connection with FIG. 2, more advanced conversion of the television standards can be realized.

FIG. 4 shows a modification of the above embodiment of the VTR according to the present invention. This embodiment is different from that of FIG. 1 in only that the television standards converter 5 and the convert control means 10, which are separately provided for the recording mode and the playback mode in FIG. 1, are shared in both recording mode and playback mode, and a video signal recording/playback processor 28 is adapted to change the processing through an internal circuit. More sepcifically, a recording/playback changeover switch (R/P changeover SW) 36 serves to change the processing in the video signal recording/playback processor 28, and also change the input to the television standards converter 5 and the output to video output terminal 7. Thus, this modification also permits the recording and playback to be realized between different television standards.

As described above, the VTR according to this embodiment is provided with the servo system(s) and video signal processing system(s) which permit the recording and playback to be carried out for different television standards signals, and the television standards converter(s) for converting one television standards signal into another television standards signal; the VTR, thereby, includes a mode for converting an input television standards signal into another television standards signal to be recorded, and a mode for converting a played-back television standards signal into another television standards signal to be outputted. Thus, the field of the usage of the VTR can be widened; the usage includes recording a television program broadcast in Japan on a video tape in PAL in order to send the tape to a friend staying in the PAL bloc in Europe, carrying back a video software from Europe to enjoy it in Japan, and dubbing in PAL a tape of how a family are doing made using a video movie machine to send the dubbed tape to a member of the family staying in Europe.

Meanwhile, the names of the television standards such as NTSC, PAL, SECAM, etc. are not familiar to average users, and usually they do not have knowledge on which television standards are adopted in which country. As the case may be, therefore, it is not suitable to cause a user or operator to designate a desired television standard name alone.

In accordance with another embodiment of the VTR according to the present invention as shown in FIG. 4, if a desired country is designated, the corresponding television standards can be automatically selected; therefore, the tape recorded in different television standards from those in one's own country can be easily played back, and also a record tape can be easily formed in different television standards from those in one's own country.

The embodiment of FIG. 4 is different from that of FIG. 1 in that the convert control means 10 is composed of an order switch 29 and a convert mode detector 30. The order switch 29 is a switch by which a user designates an object country name, e.g. a push switch on which country names are exhibited. The convert mode detector 30, on the basis of the country name designated by the order switch 29, serves to select the corresponding television standards to control the conversion operation in the television standards converter 5. Thus, if a user selects U.S.A. by the order switch 29, the convert model detector 30 selects NTSC as the television standards, and if West Germany is designated, the convert control switch 30 selects the corresponding PAL. In this way, the user is only required to select a desired country name, but not required to have knowledge on the television standards.

Figure 5:
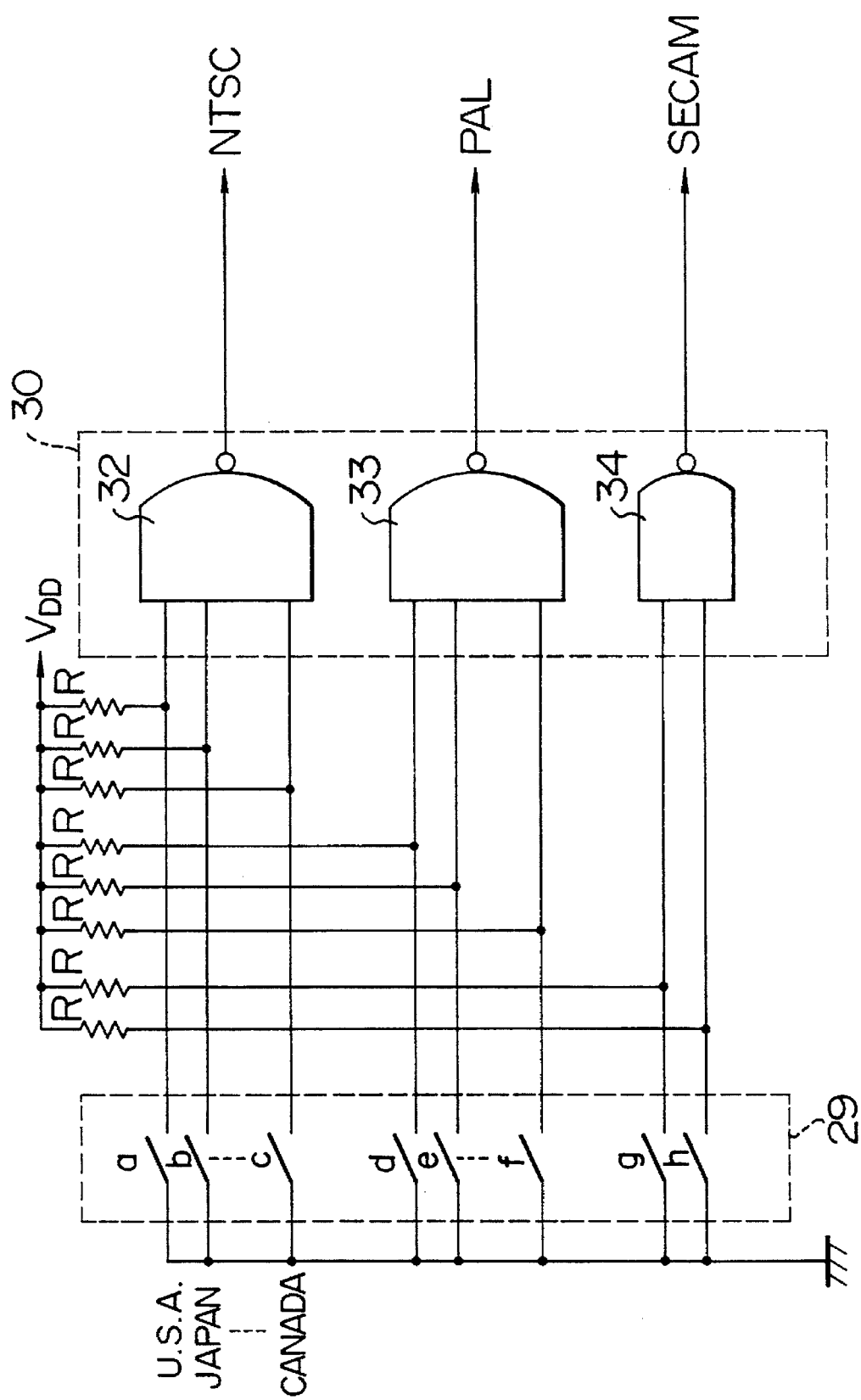
FIG. 5 is a circuit diagram of a circuit for detecting the television standards in the convert control means.

FIG. 5 shows an example of the concrete circuit for the order switch 29 and the convert mode detector 30. In FIG. 5, the order switch 29, encircled by a broken line, includes plural switches a, b, c, . . . g, h arranged correspondingly to each of countries; the countries in the same television standards are unified to input to NAND (or OR) gates 32, 33 and 34. For example, when the switch b corresponding to Japan is closed, the output from the NAND gate 32 becomes a high level 'H'; namely the output line of NTSC becomes 'H'. This means that the convert control means 10 has selected NTSC. Likewise, the switches d, e, f corresponding to the countries adopting PAL are input to the NAND gate 33 and the switches g, h corresponding to the countries adopting SECAM are input to the NAND gate 34. In this way, if the names of the countries adopting the same television standards are effectively made OR inputs, the output of the television standards can be encoded from the designation of the country name.

Figure 6:
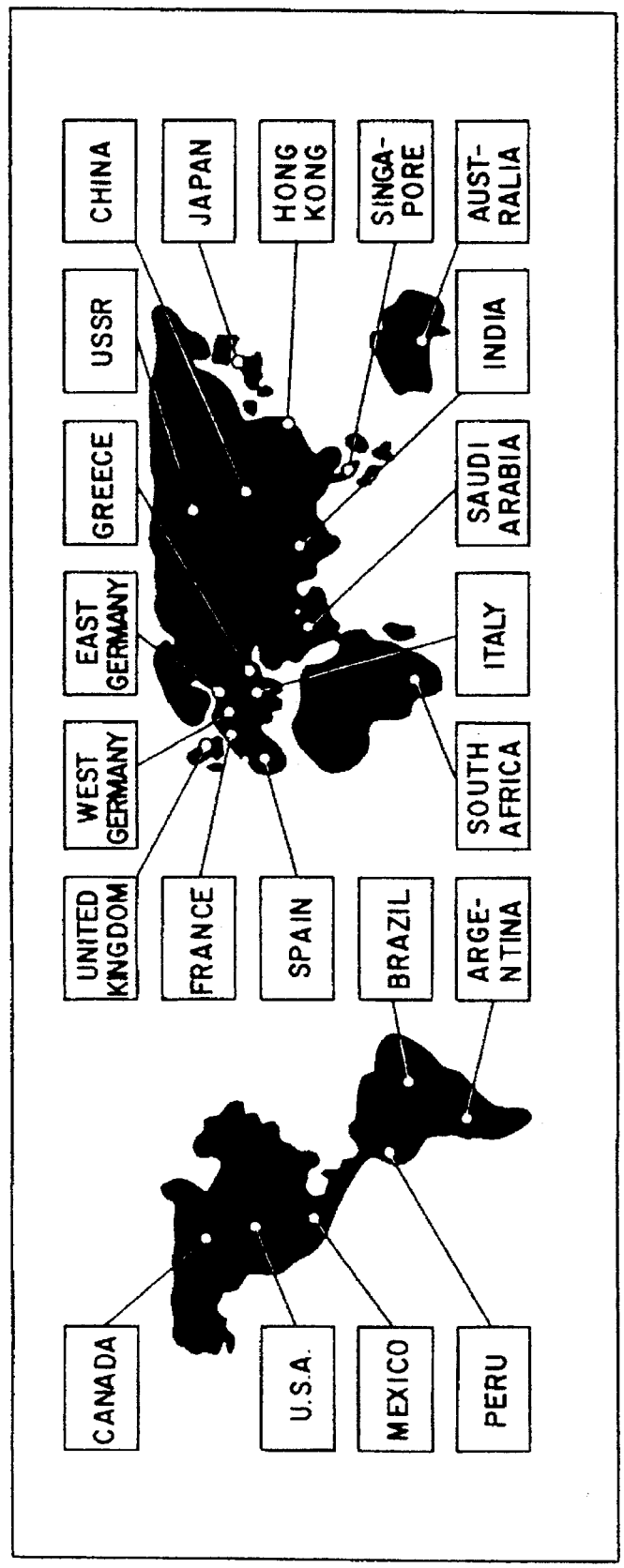
FIG. 6 is a view showing a concrete construction of the order switch 29 in the convert control means which can select desired television standards by appointing a nation name.

FIG. 6 shows an example of the order switch 29 which is designed so as to be easier for the user to use, i.e. a switch panel which permits the user to designate a desired country on a world map familiar to the user. This switch panel is composed of a sheet on the surface of which a world map is illustrated and the names of main countries are arranged in matrix using drawing lines, and touch switches arranged below the country names so that the name touched by the user can be detected. The order switch 29 according to this embodiment, on which the world map is illustrated, permits a desired country to be swiftly found out in designating the country name. The panel switch can be made more visual and effective by exhibiting the national flags and others on the sheet.

Figure 7:
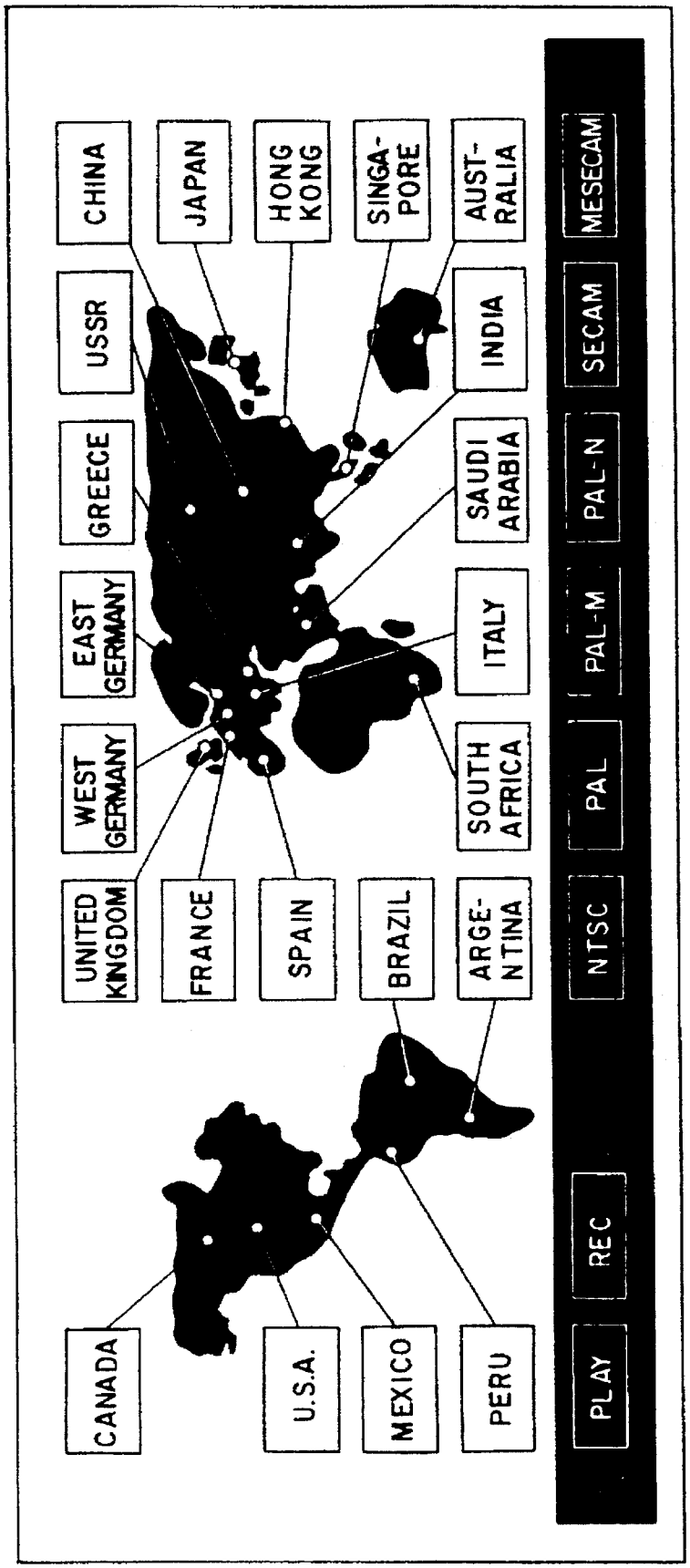
FIG. 7 is a view showing another construction of the order switch 29 in the convert control means which can select desired television standard by appointing a nation name or television standards.
Figure 8:
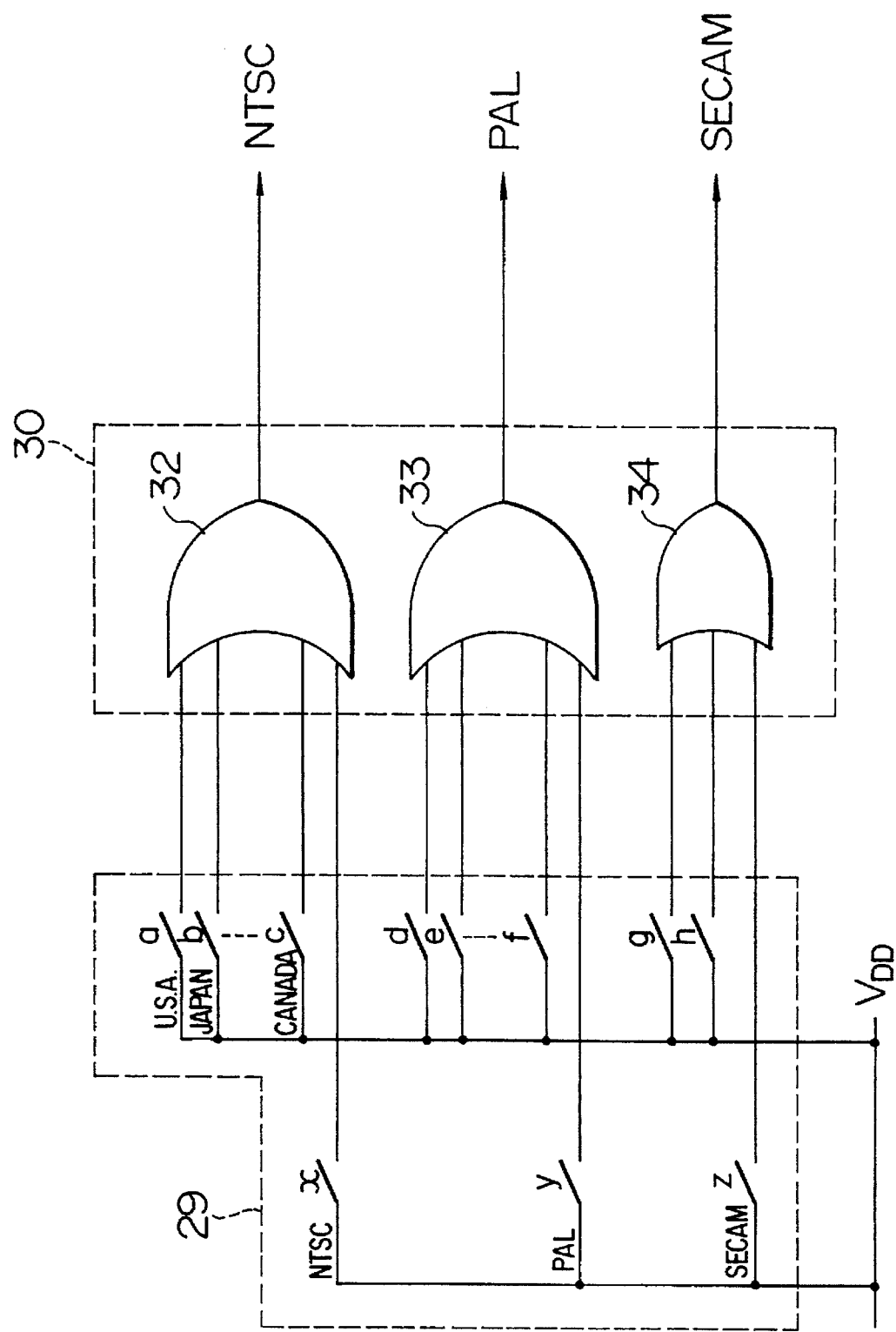
FIG. 8 is a circuit diagram of the circuit of the order switch corresponding to FIG. 7.

FIGS. 7 and 8 show the other example of the order switch 29 in the convert control means 10. As mentioned above, if the order switch can designate not only television standards which are unfamiliar to a user but a country name, it provides excellent operability. If the user has knowledge on the television standards, however, it is convenient to use the name of television standards. Moreover, most cassettes of the recorded tape have an indication of not the name of a country where the recorded tape was formed, but the name of the television standards adopted. In such a case also, it is convenient to use the television standards. This example relates to an order switch designed so as to satisfy both requirements.

FIG. 7 shows a switch panel for such an order switch 29. This switch panel is composed of a sheet on the surface of which a world map is illustrated and the names of main countries are arranged in matrix using drawing lines, and also the names of television standards such as NTSC, PAL, etc. are exhibited on the lowest column, and touch switches arranged below the country names and the names of the television standards so that the name of the country or of the television standards touched by the user can be detected.

FIG. 8 shows a concrete circuit of the order switch 29 and the convert mode detector 30 in this example. In FIG. 8, the order switch 29, encircled by a broken line, includes plural switches a, b, c, . . . g, h arranged correspondingly to each of countries; the countries in the same television standards are unified to input to OR gates 32, 33 and 34. Also, switches x, y and z corresponding to the television standards such as NTSC, PAL, etc. are input to the corresponding OR gate. Now, for example, when the switch b corresponding to Japan is closed, the output from the OR gate 32 becomes a high level 'H'; namely the output line of NTSC becomes 'H'. This means that the convert control means 10 has selected NTSC. Likewise, the switches d, e, f corresponding to the countries adopting PAL are input to the OR gate 33 and the switches g, h corresponding to the countries adopting SECAM are input to the OR gate 34. On the other hand, when the switch x for the television standards is directly closed, the output from the OR gate 32 becomes 'H' so as to select NTSC. In this way, if the user designates either the country name or the television standards, the corresponding television standards can be easily selected.

FIG. 9 shows a structure of the convert control means 10, particularly the order switch 29 designed so that a user can designate desired television standards more correctly and swiftly. As understood from the above explanation, the order switch for controlling the convert action and its display are very important for the VTR in which the television standards are converted for recording or playback. The convert control means according to this example is provided with a display part on which a desired country name or television standards designated from an operation panel by a user emits light, so that which country or which television standards has been designated can be detected at a glance. Therefore, the user can recognize immediately if or not designated country name or television standards is correct thereby to enhance easiness and certainty in the operation of the convert control means 10. Also, an order switch visually good design can be obtained.

The order switch 29 shown in FIG. 9 is composed of a print film (A), a transparent electrode touch sheet (B) and a light emission device such as EL (electroluminescence) light-emitting plate (C); they are successively piled. (A) is the transparent film on which the country names such as Japan, West Germany, France, etc. and the television standards such as NTSC, PAL, etc. are printed. (B) is a switch in which transparent electrodes are arranged on a transparent film so as to provide X outputs and Y outputs as shown in broken lines; when a user presses a country name to be designated on the print film (A), the corresponding X column electrode and Y row electrode are brought into contact. This state can be electrically detected from the X output and the Y output. (C) is the EL light-emitting plate in which the portions painted in black constitute electrodes, and when an A.C. voltage is applied between the electrodes and ground GND is applied, only the portions corresponding to the electrodes selectively emit light. In the case of this example, 'Japan' and 'NTSC' are connected to extract an NTSC terminal; if an A.C. voltage is applied between the NTSC terminal and ground, therefore, 'Japan' and 'NTSC' on the print film (A) emit light. Thus, if the order switch 29 is constituted in such a way that when the country name on the print film (A) is touched, the country name is detected by the touch sheet (B) and key matrix circuit of e.g. a microcomputer, and the detected output on-off controls the driving voltage for the EL light emitting plate (c), the order switch 29 which emits light simultaneously with touching of the country name and continues to emit light during the use can be realized. Moreover, if the country names on the print film (A) are distinguished by using different colors, the country names belonging to the respective television standards can be displayed in different colors. Incidentally, it should be noted that the light emitting plate (C) can also be constituted using liquid crystal or light emitting diodes as well as EL.

Referring to FIG. 10, still another embodiment of the VTR with the television standards converter(s) will be explained. The VTR according to this embodiment is designed to be more effectively used than in the previous embodiments. This embodiment is different from the embodiment of FIG. 4 in that a television standards detector 35 is added to the convert control means 10. More specifically, the convert control means 10 is composed of the order switch 29 by which a user designates a desired country or television standards, the television standards detector 35 for detecting the television standards of the signal to be inputted to the television standards converter 5, and the convert mode detector 30 for deciding the conversion operation mode to be made in response to the outputs from the television standards detector 35 and the order switch 29. Now, in the recording mode (A), it is assumed that an input signal is an NTSC signal and the user has designated the television standards to PAL. Then, the television standards detector 35 supplies an output of NTSC to the convert mode detector 30 while the order switch 29 supplies an output of PAL to the convert mode detector 30. In response to these outputs, the convert mode detector 30 sets the conversion mode from NTSC to PAL to instruct the television standards converter 5 to convert NTSC to PAL. On the other hand, in the playback mode (B), the signal recorded on a tape is played back by the rotary head 8 to be sent to the video signal playback processor 11. The output from the video signal processor 11 is sent to the television standards detector 35 to decide the television standards of the played-back signal. This decision is made by the field frequency which can be known from the time interval of a control signal recorded on the tape, or the format of the color signal. Further, the television standards in which the signal is to be output is designated using the order switch 29. In response to the outputs from the television standards detector 35 and the order switch 29, the convert control means 30 sets the mode of conversion to be made, and controls the television standards converter 5. In this way, the convert control means 10 decides the conversion mode using both the television standards detected by the television standards detector 35 and those designated by the user through the order switch 29. Incidentally, the television standards detector 35 is desired to be designed to automatically detect the television standards.

Figure 11:
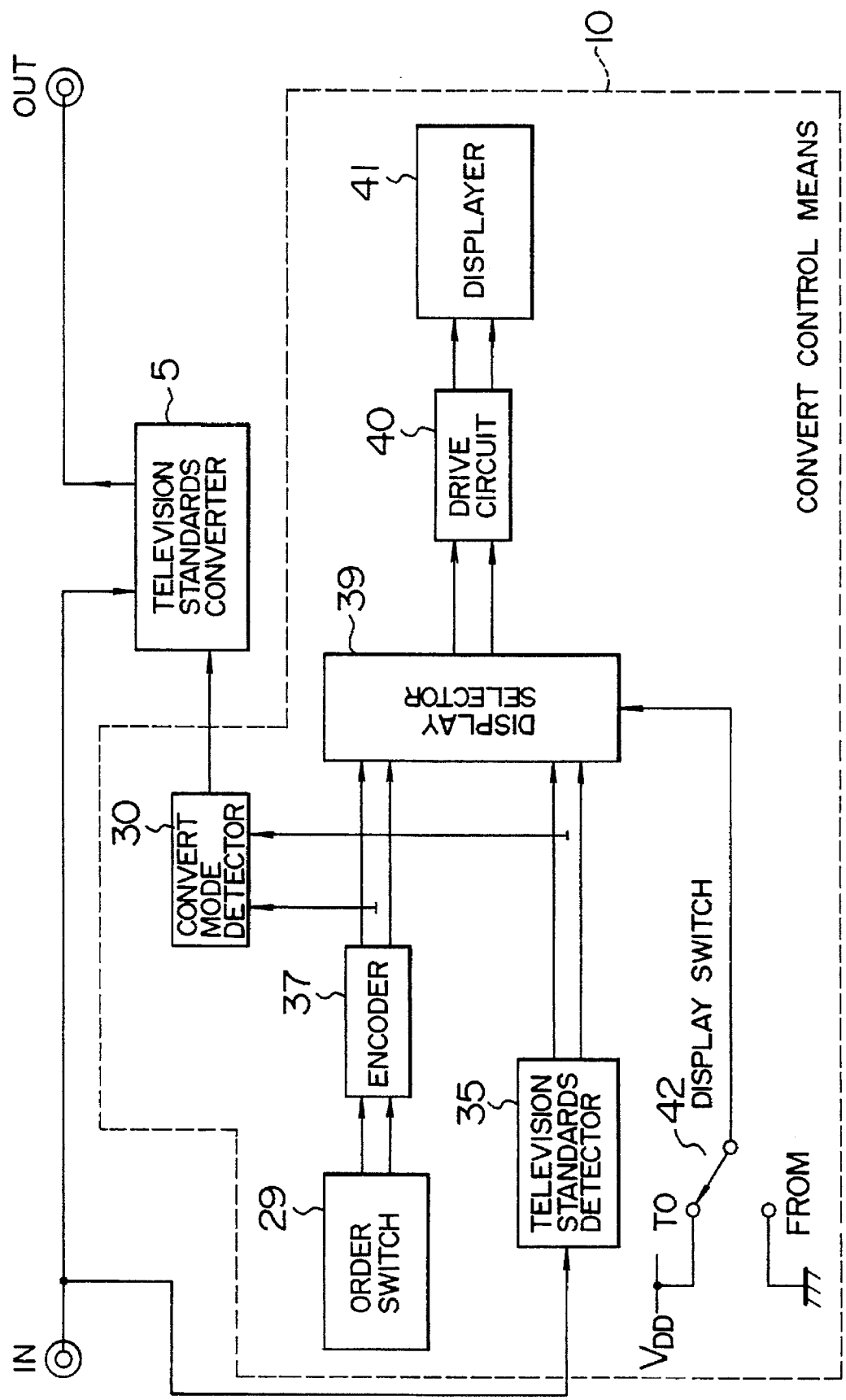
FIG. 11 is a block diagram of the detailed configuration of the convert control means including a displayer.

A further embodiment of the present invention will be explained with reference to FIG. 11. This embodiment intends to simply inform a user of the operation of conversion of television standards. The television standards detector 35 detects the television standard of the signal to be input to the television standard converter 5, and sends the information to a display selector 39 as well as the convert mode detector 30. On the other hand, the designation (name of a country or television standards) from the order switch 29 is encoded into the television standards such as NTSC, PAL, SECAM, etc.; the information is supplied to the display selector 39 as well as the conversion mode detector 30. As described previously, on the basis of both items of information, the conversion mode detector 30 sets the mode of conversion to be made, and instructs the television standards converter 5 to carry out the conversion.

Thus, supplied to the display selector 39 are the output from the television standards detector 35, which is the television standards of a conversion origin, and the output from the order switch 29, which is the television standards of a conversion destination; one of them is selected by a display switch 42 and displayed on a displayer 41 through a drive circuit 40 (For example, the corresponding parts in the switch as shown in FIG. 7 emit light). If the display switch 42 is brought into contact with the side of FROM, the television standards of the conversion source are displayed; if the display switch is brought into contact with the side of TO, the television standards of the conversion destination is displayed. In this way, with the displayer 41 being single, the provision of the display switch 42 permits the user to acquire effective information.

Figure 3:
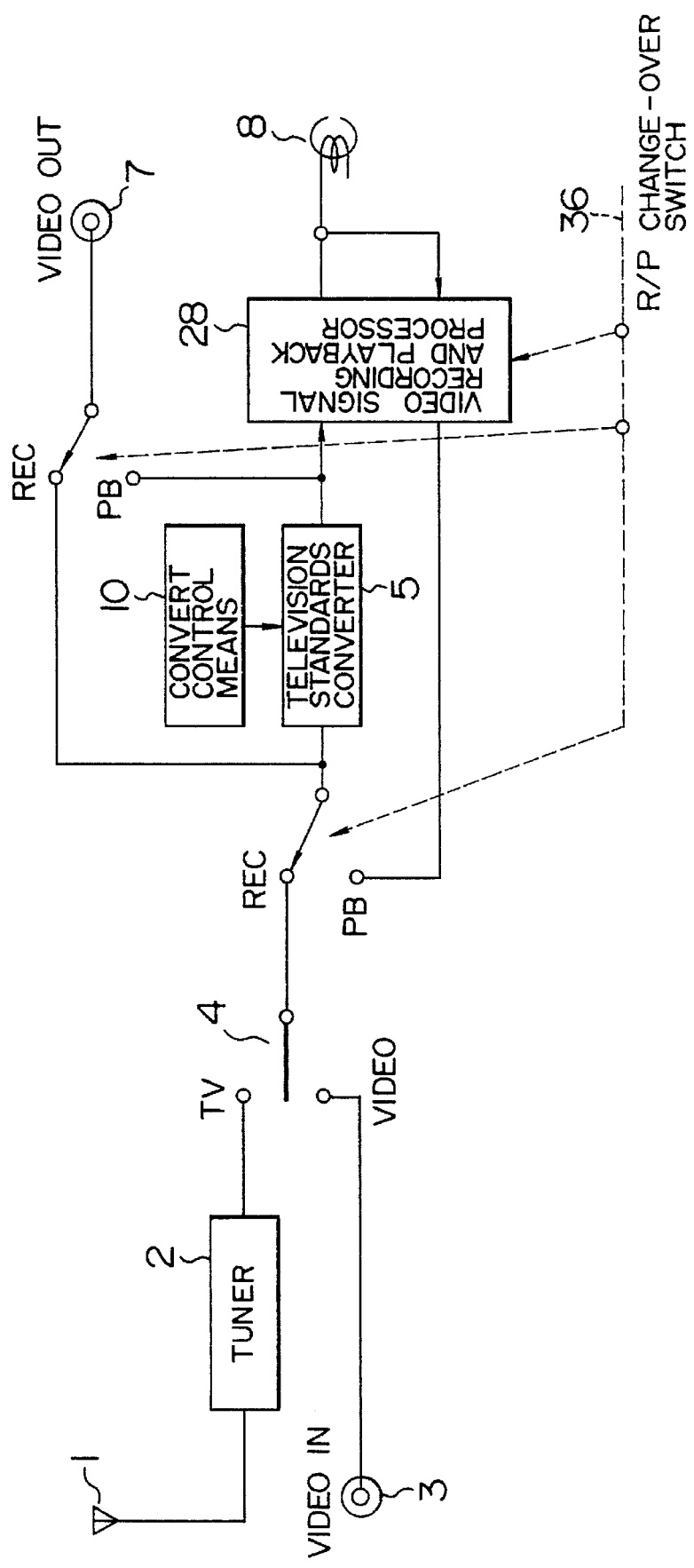
FIG. 3 is a block diagram of one embodiment of the VTR with a TSC according to the present invention in which the switching state between a recording mode and reproducing mode is illustrated.

Further, the display switch 42 can be easily engaged with the recording/playback changeover switch 36 in FIG. 3 so as to automatically select TO for recording and FROM for playback. In this way, in recording, the country or television standards corresponding to the tape to be recorded can be displayed, whereas in playback, the country or television standards corresponding to the tape being played-back can be known at a glance. Thus, a very comfortable switch and display can be realized.

Now referring to FIG. 12, the VTR according to a still further embodiment of the present invention will be explained. This embodiment intends to easily record/play back a multi-television standards signal or select a signal to be output to a television monitor. Since the entire operation was explained in connection with FIGS. 1 to 3, the construction and operation of the convert control means 10 will be explained.

35 is a television standards detector for detecting the television standards of the signal played-back from a tape; 43 and 44 are first and second order switches for designating conversion modes (e.g. mode of converting NTSC to PAL, mode of converting PAL to NTSC, etc.); and 30 is a convert mode detector for controlling the conversion operation of the television standards converter 5 on the basis of the the output from the television standards detector 35 and the output from the first order switch 43 or the second order switch 44. In this arrangement, the television standards of the conversion source can be obtained from the television standards detector 35 and the first order switch 43, whereas the television standards of the conversion destination can be obtained from the first order switch 43 or the second order switch 44. The convert control means 10, therefore, can surely understand the intention of a user to decide the conversion mode.

Figure 12:
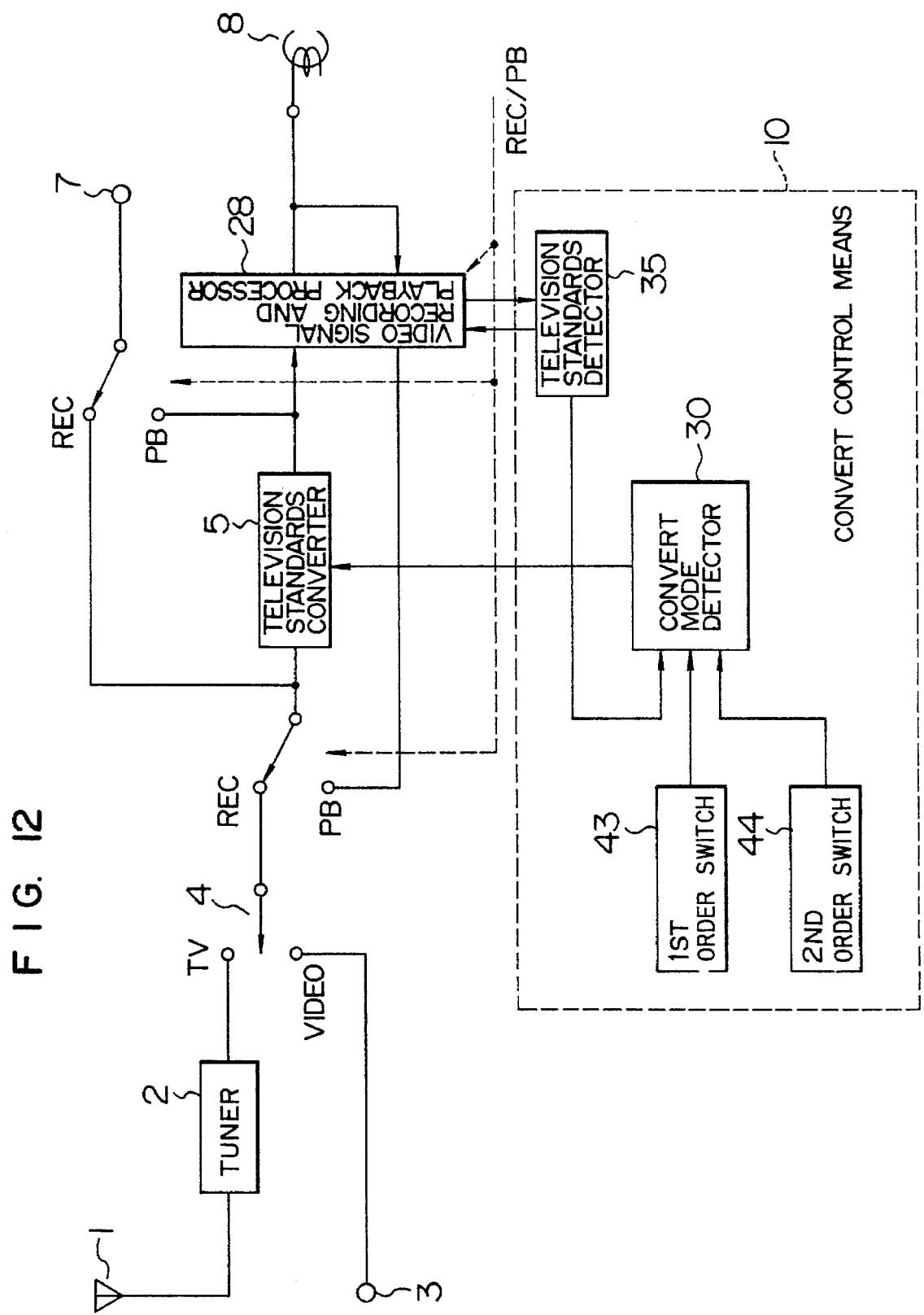
FIG. 12 is a block diagram showing the relationship between another embodiment of the convert control means and the VTR with TSC according to the present invention.

FIG. 13 shows a detailed construction of the convert mode detector 30 in FIG. 12. In FIG. 13, 45 is a source selector for selecting the television standards before conversion of the television signal to be converted by the television standards converter 5, and 46 is the other selector for selecting the television standards after conversion. Now, in the playback mode, in order to decide the conversion mode for the television standards converter 5, the source selector 45 selects the standards detected by the television standards detector 35 and the other selector 46 selects the standards designated by the first order switch 43; if the standards of the conversion source are the same as those of the conversion destination, the television standards converter 5 does not convert the television standards but produces the television signal in the original television standards. In the recording mode, the source selector 45 selects the standards designated by the first order switch 43 and the other selector 46 selects the standards designated by the second order switch 46. In this embodiment, the first order switch 43 may be usually set for the television standards adopted in the country in using the VTR and may be reset for different standards in taking out the VTR to use it in the country adopting the different television standards. In this way, in the playback mode, the signal played back from a tape can be output, regardless of its television standards, in the television standards adopted in a user's own country and so can be easily monitored by the television receiver on sale in the user's own country through the playback operation of the VTR. In the recording mode, an input television signal can be recorded in any television standards by only designating the television standards of the signal to be recorded on the tape using the second order switch 44.

Incidentally, although the operation of the convert control means 10 was realized in hardware in all the embodiments described hitherto, of course, it may be implemented using a microcomputer.

As understood from the explanation made hitherto, in accordance with the present invention, using a single inexpensive miniaturized VTR device, it is possible to record/play back a multi television standards signal, and change the standards of the signal to be played back of recorded. Also, it is possible to select desired television standards very easily.

Moreover, if the VTR according to the present invention includes the television standards adopted in the whole world, the VTR with a single specification can be used in anywhere in the world. Unlike before, therefore, it is not necessary to design the VTR with the specification corresponding to the country where it is to be shipped to. This permits the fabrication process to be standardized and reduces the production cost of the VTR.

The present invention is an answer to a difficult problem that the television standards adopted all over the world are not unified. Namely, the present invention can break through the barrier of television standards to unify video information all over the world, thereby providing a very great advantage of remarkably enlarging the use of the VTR.

We claim:

1. A video tape recorder capable of handling plural different television standards including respective representative standards using respective luminance and chrominance signals having respective different field frequencies and different numbers of horizontal scanning lines, comprising:

a video signal processing means comprising recording means and reproducing means including tape drive means and a rotary head for recording on and reproducing from a record tape video signals in plural television standards selectively, a television standards converter employing at least one field memory and a plurality of line memories, that are controlled by a memory control circuit and are provided a write clock signal by a write clock generator based upon a synchronization signal of an input video signal and a read clock signal by a read clock generator, to perform plural conversion operations, between said representative standards, selectively to convert one video signal in one of said television standards into another video signal in another one of said television standards which is different from said one of said television standards, by converting a first field frequency and a first horizontal scanning frequency of said one video signal to a second field frequency and a second horizontal scanning frequency of said another video signal;

convert control means for controlling the conversion operation of the television standards converter to operate in (i) a recording mode to convert an input video signal in a first one of said television standards into a second one of said television standards and to provide the converted input video signal to said video signal processing means for recording on the record tape and (ii) a reproducing mode to convert a reproduced video signal that is reproduced from the record tape by said video signal processing means in a third one of said television standards into a fourth one of said television standards and to output the converted reproduced video signal, said recording means being able to record said corresponding converted video signal when said corresponding converted video signal has either a same or a different field frequency and either a same or a different number of horizontal scanning lines than said first input video signal;

detector means for detecting, in said reproducing mode, a control signal recorded on said record tape, said control signal indicating a particular one which is said third one of said plural television standards in which video signals are recorded on said record tape, said detector means providing an output indicating said particular one of said television standards; and servo control means for controlling said tape drive means to control a playback speed of said record tape and for controlling a rotational speed of said rotary head in accordance with said output of said detector means indicating said particular one of said television standards.

2. A tape recorder according to claim 1, wherein said convert control means comprises a manually operable order switch movable between a plurality of switch positions for selectively designating said second one or said fourth one of said television standards in at least one of said recording mode and said reproducing mode, and a convert mode detector for providing an output signal to said television standards converter indicating the conversion operation to be performed by said television standards converter in accordance with a current switch position of the order switch.

3. A tape recorder according to claim 1, wherein said convert control means comprises a manually operable order switch movable between a plurality of switch positions for selectively designating a desired country name from among a plurality of country names to designate said second one or said fourth one of said television standards in at least: one of said recording mode and said reproducing mode, and a convert mode detector for providing an output signal to said television standards converter designating said second one or said fourth one of said television standards in at least one of said recording mode and said reproducing mode to determine the conversion operation to be performed by said television standards converter in accordance with a current switch position of the order switch.

4. A tape recorder according to claim 3, wherein said order switch includes a switch panel having a world map exhibited thereon to permit a user to designate a desired country name by pointing said order switch toward a particular country on said map.

5. A tape recorder according to claim 1, wherein said convert control means comprises an order switch on which at least one of names of countries and said plural television standards are exhibited, and a convert mode detector for providing an output signal to said television standards converter to determine the conversion operation to be performed by said television standards converter in at least one of said recording mode and said reproducing mode in accordance with a name of a country or one of said television standards designated by said order switch.

6. A tape recorder according to claim 1, wherein said convert control means comprises an order switch movable between a plurality of switch positions for selectively designating (i) one of a desired name of a country from among a plurality of country names or (ii) said second one or said fourth one of said television standards, in at least one of said recording mode and said reproducing mod, and a convert mode detector for providing an output signal to said television standards converter indicating the conversion operation to be performed thereby in accordance with a current switch position of the order switch, said order switch comprising a group of switches indicating said plurality of names of countries and said plural television standards and a display part comprising means for displaying by light emission the name of the selected country or said second one or said fourth one of said television standards in accordance with current switch position of the group of switches, whereby on the basis of the current switch position of the group of switches, said convert mode detector generates said output signal indicating the conversion operation.

7. A tape recorder according to claim 6, wherein said order switch includes a print film having at least one of a plurality of names of countries and said plural television standards exhibited thereon, a touch switch which is provided with transparent electrodes and which is arranged below said print film, and a light emission device which is locally arranged below said touch switch such that when a particular portion of said print film corresponding to a desired one of said names of countries or of said television standards is touched, a desired portion of said light emission device emits light, whereby a portion of the print film corresponding to the desired one of the names of the countries or of the television standards is displayed by light emission of the light emission device through the operation of said touch switch.

8. A tape recorder according to claim 6, wherein said order switch includes a display of all the names of countries adopting the same television standards as those in the designated country or the designated television standards.

9. A tape recorder according to claim 1, wherein said convert control means comprises a television standards detector for detecting said first one of said television standards of said input video signal, an order switch movable between a plurality of switch positions for selectively designating at least one of (i a desired country name from among a plurality of country names or (ii) said second one of said television standards in said recording mode, and a convert mode detector for providing an output signal to said television standards converter indicating the conversion operation to be performed by said television standards converter to convert said input video signal in said first one of the television standards detected by the television standards detector to the second one of the television standards designated by a current switch position of the order switch.

10. A tape recorder according to claim 9, wherein said convert control means further comprises a light emitting display means for displaying names of countries and television standards, and said light emitting display means is driven to display the name of the television standard and country of said first one of said television standards and said second one of said television standards.

11. A tape recorder according to claim 10, wherein said convert control means further comprises a displayer for displaying names of countries and television standards, and said light emitting display means is driven to display the name of the television standard and country of said first one of said television standards and said second one of said television standards.

12. A tape recorder according to claim 11, wherein said television standards detector automatically detects the television standard from a control signal and a color signal of said input video signal and said displayer is operated, in said recording mode, to display the television standard or country name designated by said order switch, and in said reproducing mode, to display one of the television standards detected by said television standards detector or the country name corresponding to the detected television standard.

13. A tape recorder according to claim 1, wherein said convert control means comprises a television standards detector for detecting said third one of said television standards of said reproduced video signal, a first order switch preset to designate a given one of said television standards and a second order switch for selectively designating a (i) desired country name or (ii) said second one of said television standards, and a convert mode detector, connected to said first order switch, said second order switch and said television standards detector, for providing an output signal to said television standards converter indicating the conversion operation to be performed by said television standards converter to convert (a) said reproduced video signal in said third one of the television standards detected by the television standards detector to the given one of said television standards designated by said first order switch or (b) the given one of the television standards designated by said first order switch to the television standard designated by said second order switch.

14. A tape recorder according to claim 13, wherein said convert mode detector is operated, in said reproducing mode, to set the conversion operation so as to convert the reproduced video signal from the television standard detected by said television standards detector to the given one of said television standards designated by said first order switch, and in the recording mode, to set the conversion operation so as to convert the input video signal from the given one of the television standards designated by the first order switch to the television standard designated by said second order switch.

15. A tape recorder according to claim 1, wherein said television standards converter comprises an A/D converter for converting an input analog video signal into a digital signal, a digital memory comprising said field memory and said plurality of line memories for memorizing the digital signal, said memory control circuit for controlling said digital memory, a sync separator for separating said synchronization signal from said input video signal, said write clock generator for providing said write clock signal to said digital memory in accordance with an output signal from said sync separator, said read clock generator for generating said read clock signal for said digital memory, and a D/A converter for restoring the digital signal into an analog signal.

16. A tape recorder according to claim 15, wherein said A/D converter separately converts a luminance signal and a color difference signal of the input video signal into digital signals and said D/A converter also separately restores the digitized luminance signal and color difference signal into analog signals.

17. A tape recorder according to claim 15, wherein said digital memory comprises said field memory for storing said digital signal in units of one field, and said plurality of line memories for storing said digital signal in units of one scanning line and said field memory is used to convert a field frequency through skip or overlap read out from said field memory and said plurality of line memories are used to convert the number of scanning lines through interpolation.

18. A tape recorder according to claim 1, wherein said television standards converter comprises a decoder for acquiring a color difference signal from the input video signal and an encoder for acquiring a desired carrier chrominance signal from the color difference signal.

19. A tape recorder according to claim 1, wherein said second one and said fourth one of said television standards are the same.

20. A tape recorder according to claim 19, wherein said first one and said third one of said television standards are the same.

21. A tape recorder according to claim 1, further comprising:
switch means for selectively switching operation of said tape recorder between a recording mode and a playback mode; and wherein:
said switch means switches said tape recorder (i) to operate in said recording mode to enable said television standards converter in cooperation with said control means and said recording means, to record on said recording medium the corresponding converted video signal of said first input video signal and (ii) to operate in said reproducing mode to enable said playback means, in cooperation with said television standards converter and said control means, to output as a playback signal the corresponding video signal of said second video signal.

22. A tape recorder according to claim 1, wherein said representative television standards include NTSC, PAL and SECAM.

23. A tape recorder according to claim 21, wherein said representative television standards include NTSC, PAL and SECAM.

24. A tape recorder according to claim 1, wherein said servo control means records, during said recording mode, a control signal on said record tape, said control signal indicating a particular one of said plural television standards.

25. A video signal recording and reproducing apparatus for converting, for recording and reproducing purposes, any one of a plurality of predetermined different television signal standards to any other one of said plurality of predetermined different television signal standards, said plurality of predetermined different television standards including respective representative standards using respective luminance and chrominance signals having respective different field frequencies and different numbers of horizontal scanning lines, said apparatus comprising:

a television signal standards conversion means, having at least one field memory and a plurality of line memories, for receiving and converting an input video signal in any one of said predetermined television signal standards into a corresponding video signal converted to any other one of said predetermined television standards including said representative television standards having respective different field frequencies and respective different numbers of horizontal scanning lines;

convert control means, including designation means for designating an optionally selected one of said television standards to be converted by said conversion means, for controlling said conversion means to cause the television signal conversion of the input video signal received by said conversion means to produce a corresponding converted video signal converted into said optionally selected one of said television signal standards;

recording means for receiving and applying to said conversion means a first input video signal in said any one of said television signal standards, and for recording on a recording medium the corresponding converted video signal of said first input video signal and produced by said conversion means, whereby said recording means is able to record said corresponding converted video signal when said corresponding converted video signal has either a same or a different field frequency and either a same or a different number of horizontal scanning lines than said first input video signal; and playback means for reproducing and applying to said conversion means a second video signal, in said any one of said television standards, recorded on a recording medium, in order to output as a playback signal the corresponding converted video signal of said second video signal produced by said conversion means in said any other one of said television signal standards, wherein:

said recording means and said playback means include tape drive means and a rotary head, and said video signal recording and reproducing apparatus further comprises detector means for detecting, in said reproducing mode, a control signal recorded on said recording medium, said control signal indicating a particular one of said plural television standards in which video signals are recorded on said recording medium, said detector means providing an output indicating said particular one of said television standards, and servo control means for controlling said tape drive means to control a playback speed of said recording medium and for controlling a rotational speed of said rotary cylinder in accordance with said output of said detector means indicating said particular one of said television standards.

26. An apparatus according to claim 25, further comprising:
switch means for selectively switching operation of said recording and reproducing apparatus between a recording mode and a playback mode, said switch means switching said recording and reproducing apparatus (i) to operate in said recording mode to enable said conversion means, in cooperation with said control means and said recording means, to record on said recording medium the corresponding converted video signal of said first input video signal and (ii) to operate in said playback mode to enable said playback means, in cooperation with said conversion means and said control means, to output as a playback signal the corresponding video signal of said second video signal.

27. An apparatus according to claim 25, wherein said servo control means records, during said recording mode, a control signal on said recording medium, said control signal indicating a particular one of said plural television standards.

28. A tape recorder capable of handling plural different television standards, for recording and playback of respective video signals in respective selected television standards, said plural different television standards including respective representative standards using respective luminance and chrominance signals having respective different field frequencies and different numbers of horizontal scanning lines, said tape recorder comprising:

a video signal processing means for recording on and reproducing from respective record tapes video signals in respective ones of said plural different television standards selectively, wherein said video signal processing means comprises recording means and reproducing means including tape drive means and a rotary head;

a television standards converter for converting a video signal in any one of said plural different television standards into a corresponding video signal in any other one of said plural different television standards, said converter having at least one field memory and a plurality of line memories for converting a received input video signal in an optional one of said representative television standards into a corresponding video signal in another optional one of said representative television standards by converting a first field frequency and a first horizontal scanning frequency of said input video signal to a second field frequency and a second horizontal scanning frequency of said corresponding video signal, said second field frequency and said second horizontal scanning frequency being different in respective magnitudes from said first field frequency and second first horizontal scanning frequency; and convert control means for controlling the conversion operation of said converter to operate in (i) a recording mode to convert a received input video signal in a first optional one of said different television standards into an optional selected second one of said different television standards and thereby to provide a corresponding converted video signal to said video signal processing means for recording on the record tape and (ii) a playback mode to convert a reproduced video signal that is reproduced from the respective record tape by said video signal processing means in a third one of said different television standards into a fourth one of said different television standards and to provide as a playback output signal the converted reproduced video signal, said recording means being able to record said corresponding converted video signal when said corresponding converted video signal has either a same or a different field frequency and either a same or a different number of horizontal scanning lines than said received input video signal, wherein:

said tape recorder further comprises detector means for detecting, in said playback mode, a control signal recorded on said record tape, said control signal indicating a particular one which is said third one of said plural different television standards in which video signals are recorded on said record tape, said detector means providing an output indicating said particular one of said different television standards, and servo control means for controlling said tape drive means to control a playback speed of said record tape and for controlling a rotational speed of said rotary head in accordance with said output of said detector means indicating said particular one of said television standards.

29. An apparatus according to claim 28, wherein said servo control means records, during said recording mode, a control signal on said record tape, said control signal indicating a particular one of said plural television standards.

* * * * *